April 27, 1926.

J. LONG

FLOORING AND SIDING TOOL

Filed Oct. 31, 1924

1,582,837

Inventor
James Long.
By Adam E. Fisher.
Attorney

Patented Apr. 27, 1926.

1,582,837

UNITED STATES PATENT OFFICE.

JAMES LONG, OF VERONA, PENNSYLVANIA.

FLOORING AND SIDING TOOL.

Application filed October 31, 1924. Serial No. 746,939.

*To all whom it may concern:*

Be it known that JAMES LONG, a citizen of the United States, residing at Verona, in the county of Allegheny and State of Pennsylvania, has invented certain new and useful Improvements in Flooring and Siding Tools, of which the following is a specification.

This invention pertains to tools for tightening up flooring, siding, sheathing and the like in the building or repairing of houses, and the object is to provide a tool of this kind in a simple and efficient form, and which can be readily operated by one man, using one hand to manipulate the tool, and the other hand for driving nails.

In the drawing

Figure 1:
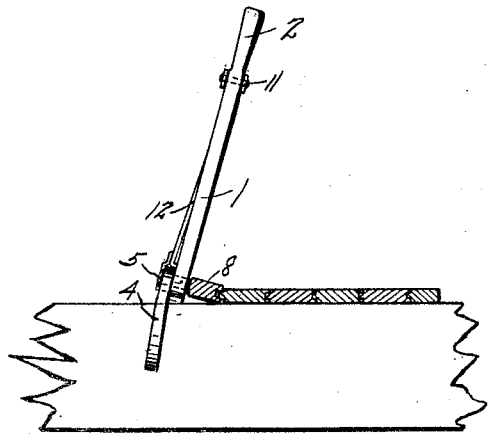
Figure 1 is an edge view showing the tool in use.
Figure 4:
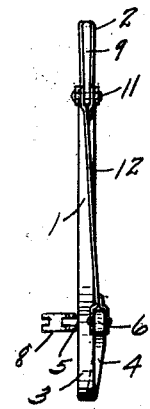
Figure 4 is an edge view.
Figure 2:
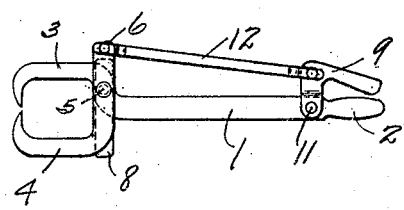
Figure 2 is a side view of the tool.
Figure 3:
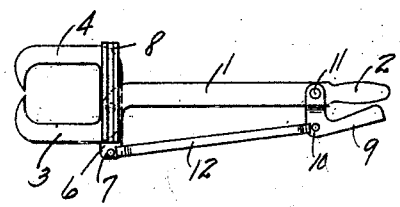
Figure 3 is a side view opposite to that shown in Figure 2.

The invention includes a main handle bar 1 having a handle 2 at one end and being formed with a rigid grab hook 3 at the opposite end. A curved and movable complementary grab hook 4 is pivoted at 5 to the base of the hook 3 and a heel 6 is extended beyond the pivotal point 5 and sets substantially at right angles across the base of the hook 3. This heel is provided with an aperture 7 in its extremity. A board block 8 is provided and pivotally mounted at one side of the base of the hooks 3 and 4, the pivot bolt 5 being extended through this block so as to afford a pivotal mounting for the block. A curved hand lever 9 having a medial aperture 10 therein is pivoted at 11 near the end of the bar 1, at the base of the handle 2. A connecting pull rod 12 is connected by its ends through the apertures 7 and 10 of the hook 4 and the hand lever 9.

In use, the hooks 3 and 4 are jammed into the joist or timber upon which the boards are being nailed, immediately above the board which it is desired to force down, and the board block 8 is positioned against the edge of the board. The hooks are thus held in place by pressure with one hand drawing the hand lever 9 toward the handle 2, and then by bearing down upon the end of the bar 1, the board is forced down tightly against its neighbor.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A device of the kind described, comprising in combination a handle bar having a handle at one end and a rigid grab hook at the opposite end; a curved and movable complementary grab hook pivoted across the base of the rigid hook and having a heel extended beyond the pivotal point; a curved hand lever pivoted at the handle portion of the handle bar; a connecting rod pivoted by its ends to the heel of the movable grab hook and to the said hand lever; and a board block pivotally mounted at one side of the base of the grab hooks, the pivot bolt connecting the said grab hooks being extended through the said board block and thereby affording a pivotal mounting for the block.

2. In a device of the kind described embodying two grab hooks pivotally connected by a bolt passed through their bases; a board block mounted at one side of the base of the connected grab hooks, the pivot bolt connecting the said grab hooks being extended through the said board block and thereby affording a pivotal mounting for the block.

In testimony whereof I affix my signature.

JAMES LONG.